July 17, 1934.  C. FIELD  1,966,441
APPARATUS FOR HEATING AND COOLING AT HIGH TEMPERATURES
Original Filed April 20, 1922   2 Sheets-Sheet 2
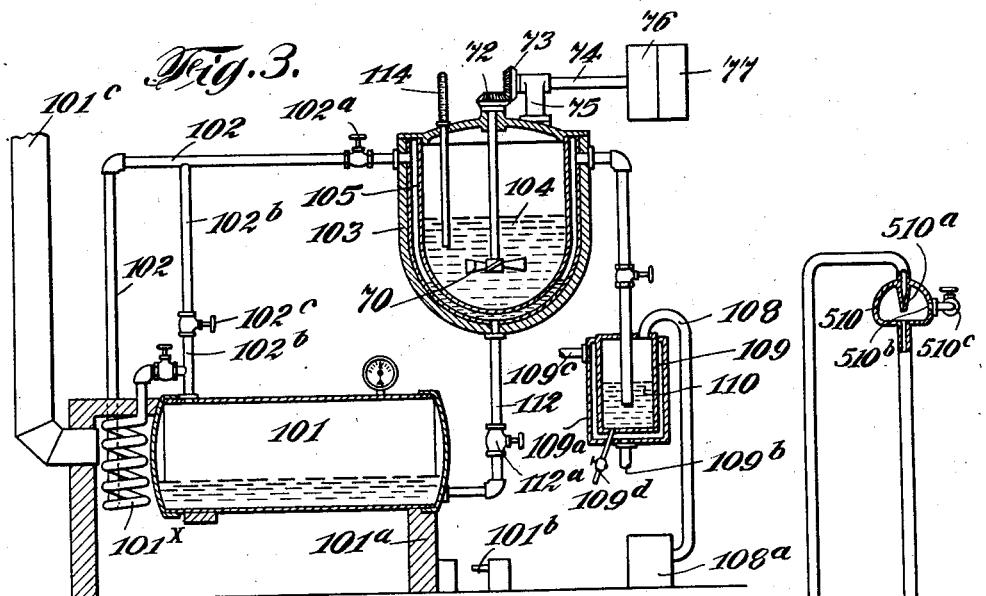
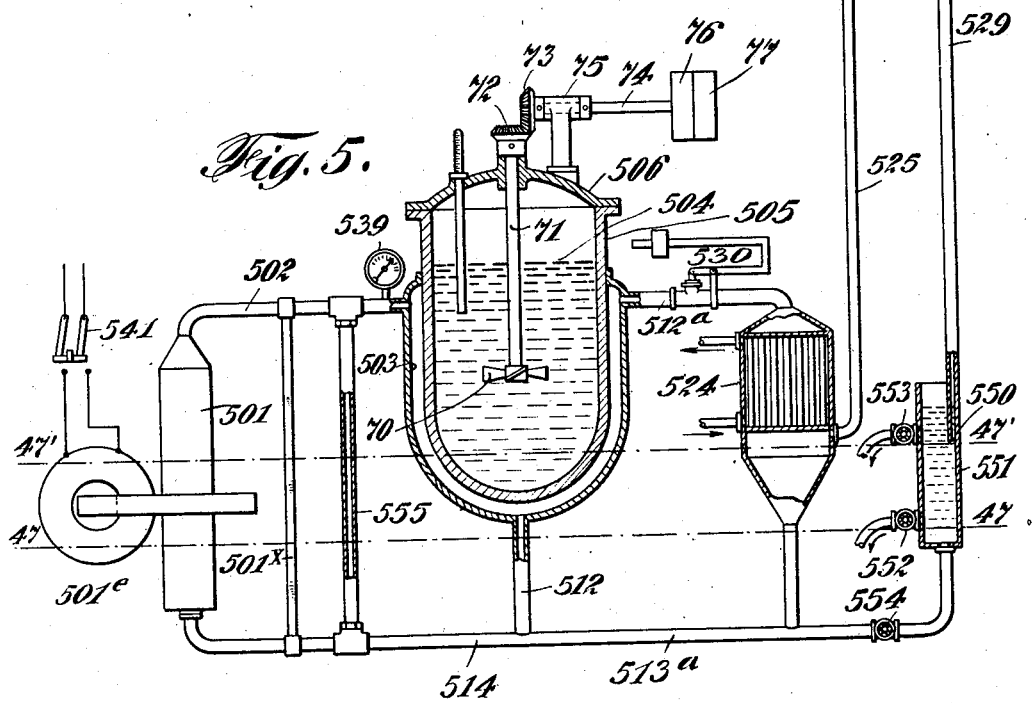
INVENTOR
Crosby Field
BY
his ATTORNEY Patented July 17, 1934

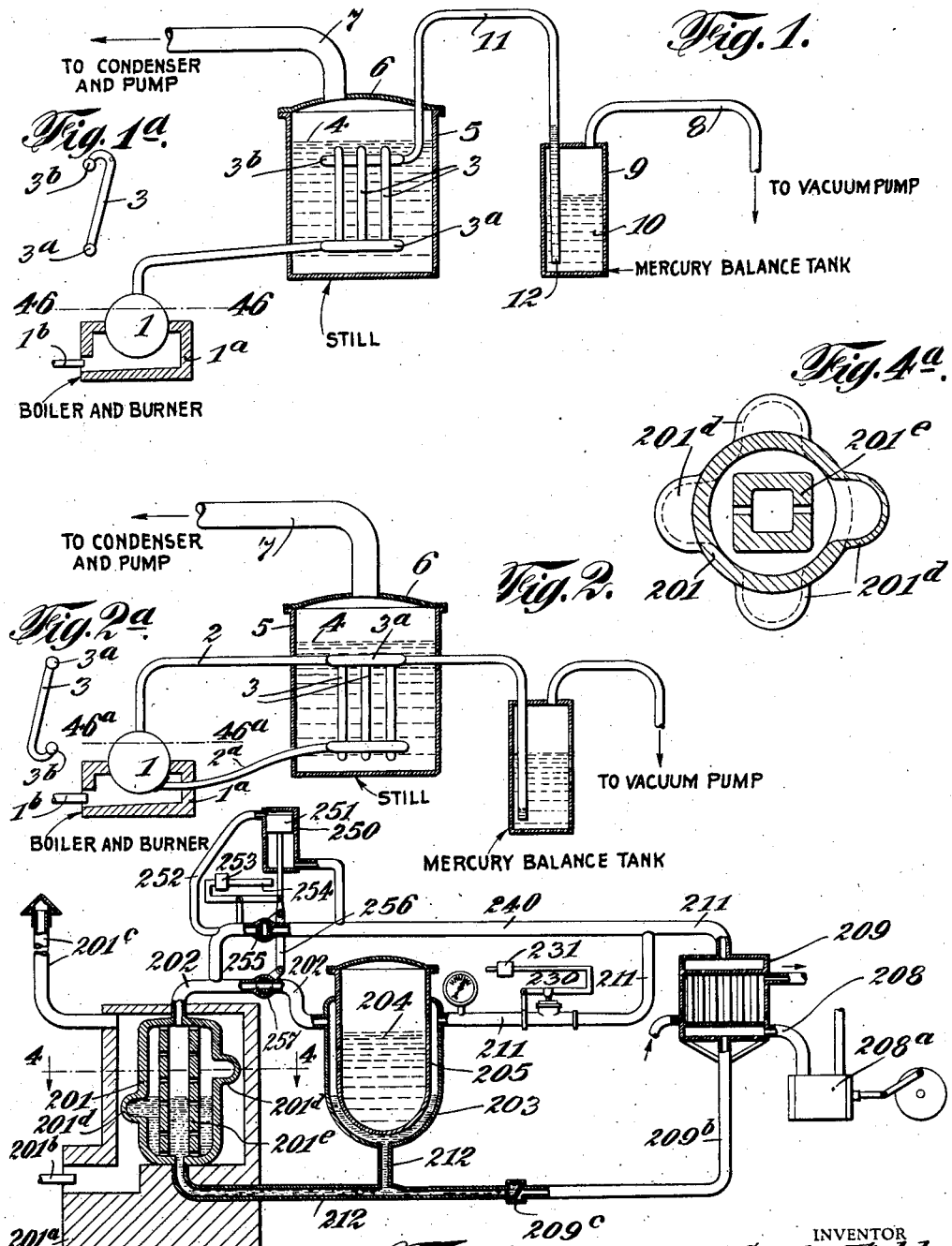

UNITED STATES PATENT OFFICE 1,966,441

APPARATUS FOR HEATING AND COOLING AT HIGH TEMPERATURES

Crosby Field, Brooklyn, N. Y., assignor to Chemical Machinery Corporation, a corporation of New York Original application April 20, 1922, Serial No. 555,657. Divided and this application February 5, 1927, Serial No. 166,073. Renewed October 10, 1933

9 Claims. (Cl. 126—370)

My present invention is more or less closely related to certain heat transferring operations of the kind described in my prior Patent No. 1,403,471, granted January 10, 1922, and application Ser. No. 553,640, filed April 17, 1922. In the present case, as in my prior case Ser. No. 555,657, filed April 20, 1922, of which this case is a division, is a liquid of boiling point much above that of water, preferably mercury; the temperatures at which heat is to be transferred are usually far above said boiling point of water; the temperatures of heat transfer either to the transferring medium or from the transferring medium, or both, are determined by the internal pressures at the boiling or the condensing points, or both; and these pressures may be controlled either by hand manipulation or automatic action of valves, pumps or other suitable pressure-controlling devices.

While the system may be employed partly or exclusively for cooling; the primary purpose illustrated is heating substances, for distillation, sublimation or chemical reaction which require limiting the temperatures for a predetermined maximum or minimum, or between a maximum and a minimum; or for different temperatures successively.

In certain cases the desired operation is continuously endothermic or heat absorbing. In such cases the heating is by the condensation portion of the cycle and the temperature control is accomplished by control of the pressure of the vapor being condensed.

An important feature of my invention concerns a system which will automatically control the temperature of a desired region when the operation in said region requires heating at one time and cooling at another time under conditions where the operation of the fluid medium must include not only a primary condition of condensing to impart heat, but also a secondary condition of boiling to absorb heat.

Hence my invention concerns maintaining a body of liquid medium in heat absorbing relation to the same region which is initially heated by condensation of the heated vapor. Preferably, this body of liquid is hot condensate which, instead of being allowed to freely escape from the condensing region, is held in heat absorbing relation to the lower part of the container on which it was condensed. My invention includes various ways of maintaining a body of liquid in heat absorbing relation to the container.

Such body of liquid is of advantage in several ways. So long as the material or mixture being heated is very much cooler than the condensate, the condensate continues to serve as a heating medium by simple conduction of heat to the material through the walls of the container. When the material or mixture has attained a steady temperature approaching that of the condensate, the latter is in position to serve as a regulating medium by absorbing heat. This may be beneficial even for purely endothermic or heat absorbing operations where the vaporized heating medium is super-heated purposely, or accidentally, as where the level of the liquid mercury in the boiler gets low; also where by some defect in the regulating apparatus the vacuum in the system is unsteady, so that the condensing temperature of the heating medium is alternately above and below the temperature of the mixture or substance being heated; also where a substance or an ingredient of a mixture being charged into the container is at an undesirably high temperature; also where the charge being introduced includes elements likely to evolve heat in a manner analogous to the evolution of heat when sulphuric acid and water are mixed. It is even more beneficial where exothermic reactions are likely to occur accidentally as by reason of impurities in the mixture or where the desired operation is being conducted at a temperature quite close to one which will precipitate an undesired exothermic reaction; also where the purpose of the heating is to induce an exothermic reaction which is desired.

In all of these cases the heat imparting operation by condensation of heated vapor and the heat absorbing operation by boiling off the condensate will occur automatically by various intentional or accidental changes of relative temperatures or pressures.

Where the heating is for the express purpose of producing a desired exothermic reaction, the heat transferring wall may be of thin sheet steel so that the temperature drop between exterior and interior is small. In such case, the primary condition of condensing hot vapor to reach the desired critical temperature for producing the exothermic reaction, and the secondary condition of boiling off condensate to absorb the heat so generated, will take effect successively and automatically upon change of a few degrees in the temperature of the mixture.

The above and other features of my invention will be more evident from the following description in connection with the accompanying drawings, in which Figs. 1, 2, 3, 4 and 5 are diagrammatic views of systems embodying my invention.

Figs. 1a and 2a are detail views, showing in end elevation, the heating condenser coils of Figs. 1 and 2, respectively.

Fig. 4a is a cross-sectional view on the line 4—4, Fig. 4.

In these drawings the boiler, pipes, valves, pumps, condensers, etc., are diagrammatically indicated. These and all other parts likely to contact with mercury are preferably of iron or steel, since iron and steel are ordinarily not attacked or even wetted by mercury. The various containers and pipes for performance of the heating function are understood to be properly heat insulated.

In Figs. 1 and 2 the systems comprise similar elements but their arrangement is different in several important particulars. In both of them there is a heat absorbing and mercury boiling element which, in this case, is a boiler 1, connecting through pipe 2 with condensing of heat-imparting coils 3, in contact with a cooling medium 4 in a suitable container 5. In this case the cooling medium is usually a compound or mixture of compounds to be heated for the purpose of causing distillation or sublimation or chemical reaction or all three, either simultaneously or successively.

The container 5 may be of any desired metal suitable for its purpose since the mercury does not come in contact with it. As shown it is hermetically closed by a top 6 communicating through a pipe 7 with the usual vacuumizing pump and cooling chamber not shown. These parts may be the ordinary vacuum distilling or sublimating unit, such as commonly employed in the manufacture of petroleum and coal tar products; and the usual mechanical stirring means (not shown) may be employed if desired.

While the mercury boiling element 1 may be usefully employed as a refrigerating element for any desired heat evolving system, it is shown in this case as being heated from any desired source, as for instance, furnace 1a, heated by oil or gas burner 1b.

A vacuum pump applies suction through pipe 8 to the upper part of tank 9 containing a body of mercury 10. The entire tank 9 serves as a mercury vapor condenser which may be cooled merely by the surrounding air as indicated in the drawings; or by a water jacket commonly employed for such purposes. The body of mercury 10 serves as a gas trap and mercury balance through pipe 11, which connects with the interior of primary or main condenser coils 3. The lower end of 11 discharges at 12, near the bottom of the body of mercury. Condensate can fall and air and gases can be sucked off without admitting outside air into the system. During out-flow of gases or vapor, whether by excess pressure from the boiler or by suction from the vacuum pump, the level of the mercury will be depressed to the mouth 12 of pipe 11, as indicated in Fig. 2, but in case of reversal of pressure as during periods of non-operation, the mercury will rise in tube 11, as indicated in Fig. 1. Preferably the height of tube 11 is at least 30 inches, so that a complete vacuum in the heating system, accompanied by a normal atmospheric pressure in 9, will be insufficient to cause reverse flow, either of mercury or outside gases, into the mercury vapor system.

The condensing coils 3 will be recognized as being similar in shape and structure to the so-called "coils" commonly employed as radiators in drying ovens and for steam heating generally. The so-called "coils" are really parallel, J-shaped, tubes 3, connecting parallel headers 3a, 3b.

In both Figs. 1 and 2, condensed mercury is trapped in the curl of the J-shaped tubes and mercury so trapped will be in heat absorbing relation to the material which is being heated by the mercury vapor in the straight parts of the tubes 3.

The principal differences between Figs. 1 and 2 are that on Fig. 1 the curl of the condenser "coils" or tubes 3 is inverted; the pipe 2 from the mercury boiler 1 is connected to the lower cross pipe or header 3b, so that tubes 3 operate as an up-flow condenser and the condensate drains by gravity back through the lower header 3b, and through vapor supply pipe 2 into the top of boiler 1; said boiler is at a low level, to permit such gravity drainage; and the liquid mercury retained in the condenser in heat absorbing relation is that trapped in the upper curl of the tubes 3 and in the upper header 3a. In Fig. 1, the level of the liquid mercury in the boiler is indicated by dotted line 46—46.

As contrasted with this, the system of Fig. 2 has the condenser tubes 3 arranged with the curl and header 3a; the pipe 2 for supply of hot mercury vapor is connected to the upper header; there is a separate return flow pipe 2a from the lower header 3b to the boiler 1, entering below the surface of the mercury therein; and the boiler 1 is on a much higher level so that with the same depth of mercury in the boiler as in Fig. 1, the lower header in Fig. 2 is submerged. Hence in Fig. 2 there is not only the body of primary condensate caught in the curl of tubes 3 which can be boiled off as in Fig. 1, but mercury can flow back from the boiler through the return pipe 2a to replenish the liquid mercury in header 3b. The level of the mercury is indicated by dotted line 46a—46a.

In Figs. 1 and 2 the temperature of the operation can be controlled by controlling the internal pressure and as most commercial operations on organic compounds will be below 357° centigrade, the boiling point of mercury at atmosphere, the working pressures will be below atmosphere and can be controlled by a vacuum pump as indicated.

It will be understood that pressure gauges on the boiler, container and condensing tank, as well as hand or automatic regulating devices for the vacuum pumps, may be employed.

Fig. 3 shows another system in which a body of condensate may be retained in bathing contact with the container that is being heated by the mercury vapor. This system includes elements functionally similar to the system of Fig. 2. There is a mercury boiler 101 and furnace 101a heated by gas or oil jet 101b, the products of combustion being discharged through stack 101c.

The hot mercury vapor flows through pipe 102 to condenser 103 in heating relation to container 105 and mixture 104. The condensed mercury flows by gravity through pipe 112 back to boiler 101, entering below the level of the liquid mercury therein. The system is vacuumized by vacuum pump 108a, applying suction to pipe 108 in the upper part of tank 109, containing a body of mercury 110 and thence through pipe 111 which communicates with the upper part of the condenser jacket 103. These parts may be the same as corresponding parts in Fig. 2. There is a water jacket 109a supplied with water through pipes 109b, 109c, for cooling the tank 109; also pipe 109d for drawing off mercury from said tank. In Fig. 3 the condenser 103 is in the form of an external jacket applying hot mercury vapor to the exterior of container 105. Other features not shown in Fig. 2 which are shown in Fig. 3 are valve 102a, for controlling the mercury vapor supply pipe 102; valve 112a for controlling the liquid mercury return pipe 112; valve 111a for controlling the vapor exhaust pipe 111; and super-heating coil 101x which may be used to super-heat the mercury vapor supply to pipe 102.

Said super-heater 101x is sometimes designed and operated for super-heating the mercury vapor enough to make up for heat losses in pipe 102 so that the said vapor will reach the condenser dry and at approximately the original boiling temperature; or at other times for a still greater degree of super-heat. In practice the variables introduced by use of the super-heater in conjunction with the adjustable pump 108a and the adjustable regulating valves 111a and 102a make it desirable to retain a body of condensate in jacket 103 in operative relation to the container 105 for absorbing heat and boiling off as above explained. In Fig. 3 this is accomplished either by adjusting valve 112a to throttle the return flow of condensate or by arranging the boiler so the liquid level will be above the level of the bottom of container 105 as in Fig. 2. Additional features shown in Fig. 3 are the pipe 102b controlled by valve 102c, which may be used to short circuit the super-heater; also the sight pressure gauge 113 on boiler 101 and a thermometer 114 projecting into the mixture 104.

In the system of Fig. 3, the primary control of the temperature is controlling the internal pressures, thereby determining the boiling and condensing points of the mercury. The internal pressures are controlled for below-atmosphere pressures through control of vacuum pump 108a, also by hand regulation of valve 111a through which the pump communicates with the condenser; also by regulation of valve 102a whereby the back pressure and boiling point in the boiler 101 may be varied independently of the vacuum in the condenser jacket; also by cutting out or cutting in the super-heating coil 101x. For most purposes the internal pressures are all below atmospheric, but the valves afford means for making them anything desired, either below or above atmosphere.

In Fig. 4 the boiler 201 is upright, and has projections 201d and a filler piece 201e affording independent paths for vertical flow of the boiling mercury. It is heated in furnace 201a by oil or gas jet 201b and the furnace has a smoke stack 201c. The mercury vapor flows through pipe 202 into condenser jacket 203 in operative relation to container 205. The condensate returns to the bottom of the boiler through 212 while gases and surplus vapor may escape through pipe 211 controlled by pressure relief valve 230 adjustable for venting at pressures above or below atmosphere by adjustment of weight 231. Pipe 211 is vacuumized by pump 208a through pipe 208, through downflow condenser 209. Condensate returns through pipe 209b and check valve 209c to pipe 212 and through it to the boiler.

The height of the boiler is such that any desired depth of liquid mercury may be maintained in the condensing jacket by simply charging the boiler to various heights. The upper unfilled part of the boiler may be operated as a super-heater.

This arrangement whereby the pressure of the liquid mercury in the jacket does not interfere with the circulation of the condensing vapor facilitates employment of an important feature not found in Fig. 3; namely, arranging so that the normal level of the mercury is substantially above the bottom of the container 205, so that the lower portion of said container is continuously bathed in a body of liquid mercury. In normal operation, this mercury will be not condensate which may be at or near the temperature of condensation as determined by the particular internal pressure then being maintained by the pressure-regulating valve 230. This body of condensate in the jacket is in an important strategic position in several particulars.

In case of ordinary work requiring only endothermic or heat absorbing operations on the material 204, the condensed mercury is free to flow downward through 212 and back to the boiler 201.

But in cases where the reaction in material 204 becomes exothermic or heat generating, this mercury automatically begins to function as a cooling medium. It absorbs heat from the container 205 and begins to boil as soon as the temperature of the mixture 204 rises slightly above the crititcal condensing temperature as determined by the pressure controlling devices. The boiled off liquid is replenished through pipe 212 in the same manner as the boiler 201. The vapor resulting from the boiling has a free path of escape through the regular vapor outlet 211 to condenser 209. Obviously the adjustment of the pressure relief valve may be changed if it is desired to conduct the heat generating reaction at a different temperature from that which initiated it.

Moreover, where said reaction may be desirably continued at a higher temperature requiring a higher internal pressure of the mercury vapor the sudden and great increase in the total volume of vapor due to the jacket becoming a mercury boiling instead of a mercury condensing device may be taken advantage of to cause control to shift to a pressure relief valve set for a higher pressure and temperature than the one which controls the initial heating.

For this purpose and for purposes of safety in general, I may employ a relief valve adapted to shunt the mercury vapor through pipe 240 to the condenser 209. Automatic means for controlling this shunt are diagrammatically indicated as comprising a cylinder 250, containing piston 251 adapted to be actuated downward by excess pressures through pipe 252 communicating with pipe 202. The piston may be adjustably counter-balanced to operate at a desired pressure by means of weight 253 on lever 254. The operating pressure differential may be the pressure drop between pipe 252 and atmosphere or between pipe 252 and the shunt pipe 240. Sudden increase of pressure in pipe 202, as where the reactions in 205 become exothermic, will force piston 251 downward opening by-pass valve 255. If desired, the same piston movement may operate through link 256 to close valve 257 in pipe 202. Such openings and closings may be alternating according to conditions and may be partial or complete.

In Figure 5, the boiler 501 is upright and extends from below the lowest level of mercury indicated by line 47, 47, to a point well above the higher level indicated by 47', the former line being below the bottom of the jacket 503 and the latter above the bottom of container 505. This boiler 501 forms part of a single turn secondary, the circuit of which is completed through copper bar 501x which is of low enough resistance to practically short circuit the rest of the system. The secondary is energized by primary coil 501e controlled by switch 541.

The container 505, jacket 503, vapor supply tube 502, gauge 539, vapor outlet tube 512a, downflow tube 512 for the condensate, supplemental condenser 524, and pipes 513a and 514 may be the same as in preceding figures. For convenience there is preferably a glass gauge 555 connecting pipes 502—514 for indicating the level of the mercury in the system. In this system the pressure controlling valve 530 is located in the pipe 512a between the jacket 503 and the condenser 524 and, as diagrammatically indicated, it is adapted to be set for pressures above or below atmosphere. The exhaust pump is beyond the condenser and consists of a well-known form of barometric jet condenser comprising the upwardly extending suction tube 525 for the vapor, discharging downwardly through the jet 510a in chamber 510 supplied with water through opening 510b controlled by valve 510c. This chamber connects with downwardly extending tube 529 which is preferably long enough to afford a barometric column when water is the fluid. The pipe 529 has an outlet at 550 below the level of the liquid in container 551. This container has two water outlets, one 552, to drain off water when the mercury level is at 47, 47, and the other 583, when it is at level 47', 47'. The mercury vapor is condensed by the water and settles out in the container 551. Preferably all of the vapor is condensed in the pump tube 529, but it will be obvious that if any uncondensed vapor escapes from the latter, the container 551 will serve as a residual condenser. It might be returned to the system through a barometric U tube, but as shown there is a hand operated valve at 554 which is opened only when the internal pressures are suitable for in-flow of mercury without disturbing of the adjustment of the apparatus.

In the systems of Figs. 3 and 5, where a body of liquid mercury may be and preferably is maintained in contact with the lower portion of the container which is being heated by condensation of the mercury vapor, there is special advantage in employing a vertically arranged propeller to afford vertical circulation of the mixture, and I have shown for this purpose a screw propeller 70 on the lower end of vertical shaft 71 journaled in the cover 506 and power driven through any suitable means, as for instance, a bevel gear 72 driven by gear 73 on shaft 74 which is supported in a bearing 75 and may be rotated from any desired source of power diagrammatically indicated by belt pulleys 76, 77, one of which may be an idler while the other is keyed to said shaft 74. The vertical circulation thus provided is important not only for mixing but also for driving hot mixtures into cooling relation with the liquid mercury for boiling the latter during exothermic reactions and also for displacing the cooler material upward in heating relation with the condensing area of the container when the operation is endothermic.

It will be understood that the presence of liquid mercury in bathing contact with the same container which is heated by condensation of hot vapor supplied from an outside source, is of great importance, not only for controlling the temperature during desired exothermic reactions, but also as an ever-present refrigerating medium which will automatically come into operation as a safety appliance in cases where undesired exothermic reactions may occur by accident as in case of certain impurities in certain mixtures or in case of faulty regulation by the pressure controlling devices.

A not uncommon case is where there is a small amount of impurity capable of oxidizing or other exothermic reaction within the range of the desired operating temperature. In such case the refrigerating action of the boiling mercury will be sufficient to keep down the temperature until the exothermic reaction has been completed, after which the process will proceed as before. In other cases as where the amount of material for the exothermic reaction is considerable, it may be necessary to have expert attendance and regulation to completely take care of the situation. Even in cases where the danger never materializes, the advantage of the liquid mercury as a precautionary safety device is obvious.

It will be understood as to all of the systems shown herein that adjustment of heating current may be such as to boil mercury at rates sufficient to supply more vapor than will be condensed in the heating coil or jacket. Such excess represents waste but unless maintained the system will operate only with upper limit regulation. If, however, the vapor is always in excess, the working temperature will be kept up to the predetermined limit as well as prevented from falling below it.

While the various systems disclosed herein are capable of being operated either above or below atmosphere, there are great advantages in employing them for the operations which can be performed at or below atmospheric pressure, that is, for temperatures at or below 357° Centigrade, the atmospheric boiling point of mercury. Hence, as will be evident, a great variety of heating operations, particularly for chemical reactions can be accomplished with the pressure valve, 230 or 530, set to blow at or below atmosphere. In the below-atmosphere operation there can be no leaks of mercury to the exterior. Any leaks must be inward into the system and any impurities thus introduced are drawn off with the excess uncondensed vapor and are gradually worked out of the system by continued operation of the vacuumizing pump. While the leaks are thus in the direction of safety as regards human life and are taken care of as above described, it is to be understood that they are highly undesirable and the greatest possible care is taken to prevent them.

In my prior application first above mentioned, I have stated that mercury vapor may be obtained at 430° Fahrenheit, under a pressure of only nine-tenths pounds to the square inch. Higher degrees of heat may be obtained with corresponding increase in pressure. I have also described how these pressures, required for desired temperatures, can be maintained by a vacuum pump operated and controlled in the usual manner in connection with an ordinary pressure gauge which indicates the boiler pressure. While the inventions claimed in said application Ser. No. 553,640 can be practised by manual control of the pump in connection with the gauge, there are important advantages in employing automatic means for the purpose. Hence my present application includes certain varieties of automatic means which may be used for controlling internal pressures. Also said automatic means include devices that are capable of operation for above-atmosphere as well as below-atmosphere pressures. Specifically considered, the principal regulating means are in the nature of relief valves and, to take care of the specific case where the internal pressures are below-atmosphere, there are the various forms of vacuumizing pumps. Such pumps require no special description or illustration, being well-known in the art, and they may be supplied with automatic control mechanism to maintain only the required degree of vacuum; and when the valves are set for above-atmosphere pressures, the pumps may be cut off either by hand valves as indicated in Fig. 3, or by any desired automatic mechanism.

It will be understood that the pressure relief valve, such as 530, is diagrammatically indicated as having the internal pressure on the valve element directly opposed by external atmospheric pressure, the external pressure being adjustably decreased or increased by the weighted lever. It will be understood, however, that I may employ separate motive means, adjustably governed by the pressures, to do the work of moving the valves, thereby making the regulation closer and more certain.

In systems of the type herein described, transfer of heat at practically desirable rates requires boiling and condensing of relatively large amounts of mercury. The velocity of the vapor flow is great and the resulting friction may give rise to a certain amount of back pressure. Hence it will be understood as to all of the systems the mercury level in the boiler may be somewhat below that in the pipes leading from the condensers and it will sometimes be necessary to make allowance for this.

In this same connection it may be noted that the condensed mercury may be regulated to a desired higher level than the mercury in the boiler by throttling the return flow of the condensed vapor. For instance, in Fig. 5 the mercury may be raised to or above the level 47'—47' in the condensing jacket while the mercury in the boiler is at a much lower level by suitably adjusting valve 570 which can be inserted in pipe 512. Also the back pressure could be increased by partially closing a valve which can be arranged in pipe 502, like 102a, Fig. 3. Preferably, however, the back pressure should be kept as small as possible so that the pressure throughout the entire system may be more nearly uniform.

In all of the systems shown herein the region which is to be primarily heated to a predetermined temperature and which in operation has a body of hot condensate maintained in heat absorbing relation thereto, is indicated as a very simple form of container which must be partially or wholly recharged from time to time and the charge to be operated upon is indicated as a liquid. It will be understood, however, that the heat transfer methods and their application to the operations being performed in or upon the mixture, may be the same, or at least equivalent, when the container is designed or equipped for a continuous process, one or more materials being continuously supplied in predetermined quantities; also where one or more of the materials are primarily solids either remain such or adapted to become liquid or gaseous; or liquids, either remaining such or adapted to become solids or gases; or gases either remaining such or adapted to become liquids or solids, all either with or without chemical change. It will be understood also that the "solids", "liquids", "gases", "solutions", "materials", "mixtures", etc., mentioned herein include semi-solids, semi-liquids, vapors and sublimates in all of the various physical forms and states of matter for which heat transfer at high temperatures may be necessary or desirable. The preferred methods cover temperatures ranging from just below the lowest red heat of iron down to the minimum vacuum boiling point of mercury, and particularly where close temperature regulation within a very narrow range is necessary or desirable, and particularly where the heat transfer is with reference to a material or materials requiring initial heat application to be followed automatically by heat absorption when a predetermined temperature is exceeded. In the latter class is obviously included the cases where the heating to a predetermined high temperature produces an exothermic chemical reaction, the sensible heat of which must be absorbed to keep down temperature.

I claim:

1. A closed mercury boiling and condensing system, including a mercury boiler, means for heating it, a condenser, conduits for flow of vapor from the boiler to the condenser, and for return flow of condensate to the boiler, and a container for maintaining material in heat absorbing relation to the condenser, the bottom of said condenser extending below the level of the mercury in the boiler in combination with pressure regulating means to maintain approximately constant pressure in said system.

2. A closed circuit system for indirect heating to high temperatures including a mercury boiler element, a condenser element, a conduit for flow of mercury vapor from the boiler to the condenser and a return conduit for flow of condensate from the condenser to the boiler, the condenser element including a container for maintaining the material to be heated in heat absorbing relation to said condenser element, and having its lower portion below the normal level of the liquid mercury in the boiler; in combination with a supplemental condenser means for cooling the same, and means connecting said condenser with an outlet from said first condenser.

3. The combination specified by claim 2, with a return conduit for condensate from the supplemental condenser to the boiler.

4. The combination of claim 2, with a pump for vacuumizing the system and means for connecting said pump with the outlet of the first condenser.

5. The combination of claim 2, with a vacuum pump exhausting from the supplemental condenser and a residual condenser for the outlet of the vacuumizing pump.

6. The combination specified by claim 2, with a pressure operated relief valve adjustable to open at a predetermined pressure below atmosphere, and a vacuum pump maintaining a vacuum in the system below said predetermined pressure.

7. A heating system comprising a container for material to be heated, a heating jacket for the container, a mercury boiler, out-flow and return conduits connecting the boiler with the jacket, said mercury boiler extending substantially above and below the level of the bottom of said container, whereby the level of the mercury in the system can be varied to bring the same into or out of bathing contact with the bottom of said container.

8. A heating system comprising a container for material to be heated, a heating jacket for the container, a mercury boiler, and out-flow and return conduits connecting the boiler with the jacket, and means for variably controlling return flow of condensate to adjust the level of the mercury in or out of bathing contact with the bottom of said container.

9. A closed circuit system for indirect heating to high temperatures, including a mercury boiler element, a condenser element, a conduit for flow of mercury vapor from the boiler to the condenser element and a return conduit for flow of condensate from the condenser element to the boiler, the condenser element including a container for maintaining the material to be heated in heat absorbing relation to said condenser element, said system embodying means whereby a body of hot condensate may be retained in the condenser element in heat absorbing relation to said material.

CROSBY FIELD.